United States Patent

[11] 3,627,960

| | | |
|---|---|---|
| [72] | Inventor | Frederick M. Grabek<br>Kettering, Ohio |
| [21] | Appl. No. | 87,480 |
| [22] | Filed | Nov. 6, 1970 |
| [45] | Patented | Dec. 14, 1971 |
| [73] | Assignee | General Motors Corporatin<br>Detroit, Mich. |

[54] APPLIANCE LID INTERLOCK MECHANISM
4 Claims, 3 Drawing Figs.

[52] U.S. Cl..................................................... 200/61.64,
70/271
[51] Int. Cl....................................................... H01h 27/10
[50] Field of Search.................................. 200/61.62–61.84;
335/253, 254; 70/271

[56]             References Cited
         UNITED STATES PATENTS
3,205,031   9/1965   McMillan..................... 200/61.67 X
3,272,935   9/1966   Beller et al..................... 200/61.64 X

*Primary Examiner*—Robert K. Schaefer
*Assistant Examiner*—M. Ginsburg
*Attorneys*—Frank J. Soucek and Charles R. Engle ABSTRACT: A lid interlock mechanism for an appliance cabinet of the type having an access opening closed by a pivotal lid. A keeper is secured to the lid and extends into the cabinet when the lid is closed. A switch assembly is mounted adjacent the access opening and has an actuating arm extending into the opening. A solenoid assembly is also mounted adjacent the access opening and has a latch member secured to the armature thereof. Closing movement of the lid engages the keeper with the switch-actuating arm closing the switch. The switch is connected in the appliance control circuitry to energize the solenoid and engage the latch member with the keeper maintaining the lid closed during specific portions of the appliance operating cycle.

PATENTED DEC 14 1971

3,627,960

INVENTOR.
Frederick M. Grabek
BY
C. R. Eagle
ATTORNEY

APPLIANCE LID INTERLOCK MECHANISM

BACKGROUND OF THE INVENTION

Various forms of appliance lid interlock mechanisms have been developed heretofore. The usual mode of operation of these devices includes a manually actuated handle wherein it is necessary to actuate the handle and simultaneously close a switch to condition control circuitry for performance of the appliance cycle. These forms of construction have necessarily required somewhat intricate latching mechanisms in conjunction with the manually actuatable handle to accomplish this result. It is therefore a purpose of this invention to provide a simple mechanism whereby closure of an appliance lid automatically closes control circuitry permitting operation of the appliance while simultaneously moving a latching member into engagement with a lid keeper thereby retaining the lid closed during specific portions of the operational cycle.

SUMMARY OF THE INVENTION

An object of this invention is to provide an improved lid latch and interlock mechanism wherein the lid is automatically retained closed during specified portions of the automatic cycle.

Another object of this invention is the provision of a switch being automatically actuated by closing movement of the lid thereby conditioning the control circuitry for automatic progression through an operational cycle.

A further object of this invention is the provision of a keeper on an appliance lid wherein the keeper engages a switch-actuating arm closing the switch and conditioning control circuitry for operation of the machine while simultaneously energizing a solenoid actuating a latch member into locking engagement with the keeper during operation of the appliance.

A still further object of this invention is the provision of a supporting plate having a solenoid assembly and a switch assembly secured thereto and being positioned such that a keeper attached to the appliance lid engages and closes the switch when the lid is closed conditioning the control circuitry for operation of the appliance while simultaneously energizing the solenoid and actuating a latch member into engagement with the keeper while the appliance is in operation.

DESCRIPTION OF A PREFERRED EMBODIMENT

Figure 1:
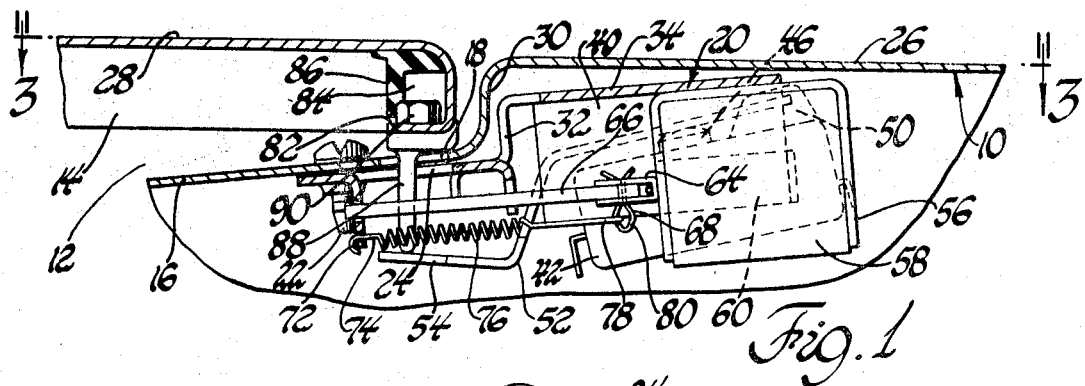
FIG. 1 is a partial sectional elevational view illustrating a supporting plate having a switch assembly and a solenoid assembly attached thereto, the armature of the solenoid being retracted to engage a latch with a keeper.

Referring now to FIG. 1, an appliance cabinet 10 is shown including the usual access opening 12 closed by a pivotally mounted lid 14. The cabinet 10 includes a peripheral flange 16 extending around the opening 12 and containing an aperture 18 positioned at a predetermined location. A support plate 20 is secured to the flange 16 by a plurality of screws 22 and also contains an aperture 24 in alignment with the aperture 18 in flange 16. The cabinet 10 is formed so that top surface 26 is substantially in a plane with surface 28 of the pivotally mounted lid 14 when the latter is closed. The surface 26 joins flange 16 via a vertical portion 30. The support plate 20 likewise comprises a vertically extending portion 32 placing surface 34 adjacent the underside of cabinet surface 26.

Figure 3:
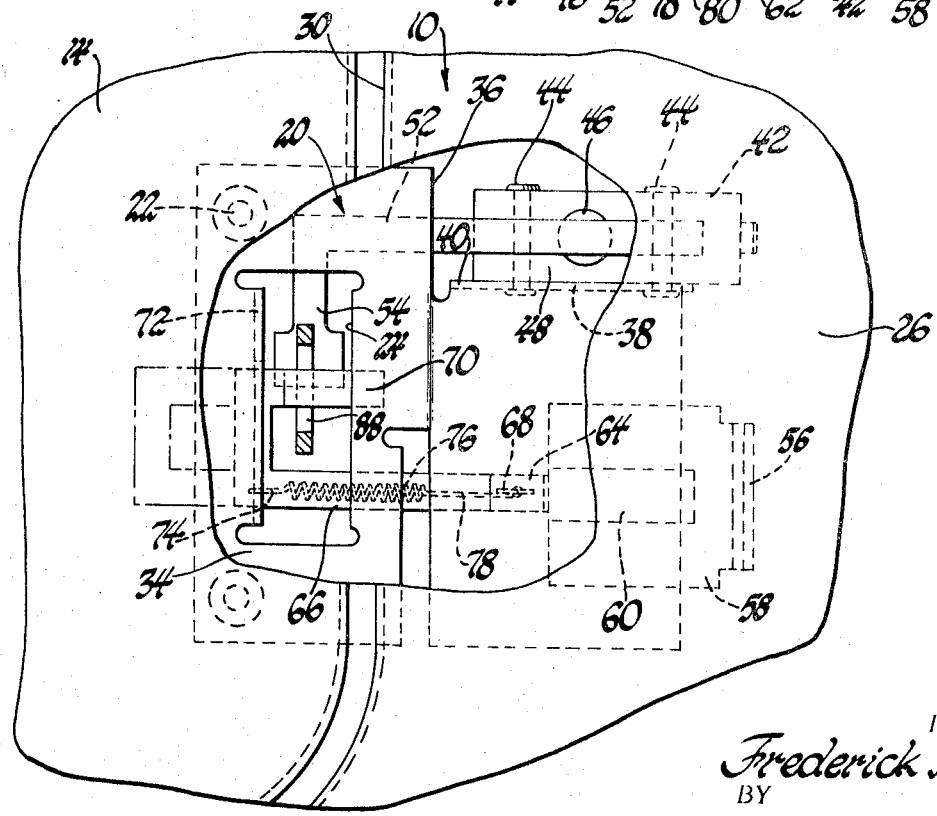
FIG. 3 is a partial plan view of FIG. 1 taken on line 3—3 of FIG. 1.

The support plate 20 includes a cutout portion 36, best illustrated in FIG. 3, one edge 38 defining the cutout 36 being bent to form a vertically extending flange 40. The flange 40 has a switch assembly 42 secured thereto by a plurality of rivets 44.

The switch assembly 42 includes an actuating button 46 positioned centrally on its upper surface 48. The switch assembly 42 also includes a raised portion 50 receiving and having secured thereto, a switch-actuating arm 52 configured to have a terminal end 54 underlying the aligned apertures 18 and 24 in flange 16 and support plate 20.

A U-shaped bracket 56, with a solenoid assembly 58 mounted thereon, is also secured to the support plate 20. The solenoid assembly 58 includes an armature 60 which is reciprocally actuated within the assembly 58. Attached to the exterior end 62 of the armature 60 is a clevis-type bracket 64 receiving one end of latch member 66, the clevis receiving a key 68 to retain the latch 66. The latch 66 is J-shaped in form and is positioned such that retraction of armature 60 within the solenoid assembly 58 moves a locking leg 70 of the latch toward the solenoid assembly 58 as shown in FIG. 3. The support plate 20 also includes a downwardly extending flange 72 adjacent one edge of the opening 24, the flange 72 receiving one end 74 of a spring 76 having its other end 78 secured in a loop portion 80 of the aforementioned retaining key 68.

The appliance lid 14 includes a bent back flange 82 around the periphery of the door defining a cavity 84 sealed by a peripheral seal 86. The seal 86 prevents entrance of water onto the upper surface of the flange 82. A closed loop keeper 88 is secured to the flange 82 by conventional screws 90. The keeper 88 is positioned on the flange 82 for entrance into apertures 18 and 24 when the lid 14 is moved to a closed position.

Figure 2:
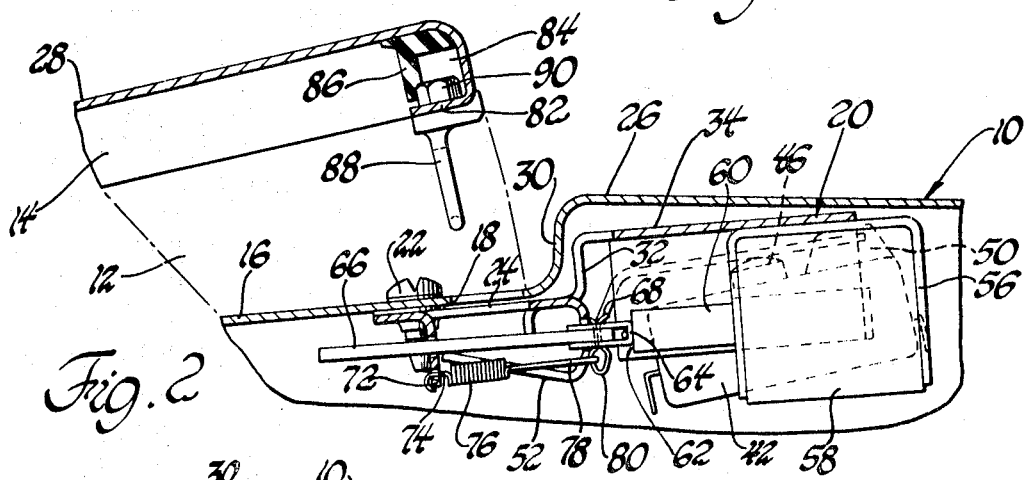
FIG. 2 is a partial sectional elevational view illustrating the appliance lid partially opened with the solenoid armature extended and the latch member in a released position.

In operation, when the appliance lid is in an open position as illustrated in FIG. 2, the latch member 66 is extended to an unlatched position by spring 76 moving leg 70 clear of the opening 24 in the support plate 20. Manual movement of the appliance lid 14 toward a closed position causes the keeper 88 to enter apertures 18 and 24 where it eventually engages terminal end 54 of switch-actuating arm 52. Sufficient movement of the switch-actuating arm 52 depresses switch button 46 and conditions the appliance control circuitry, for example in the case of a clothes-washing machine, for the initiation of a washing cycle. Closure of the switch assembly 42 also completes a circuit to the solenoid assembly 58 and the armature 60 is retracted within the solenoid assembly 58. Movement of the armature 60 to a retracted position moves latch member 66 toward the solenoid assembly positioning the locking leg 70 of the latch member within the closed loop of keeper 88. In this position the leg 70 of the latch member 66 obviously prevents opening of the lid 14 due to its engagement with the keeper 88 should opening movement of the lid be attempted.

From the above description it is apparent that this arrangement could be connected in circuitry with any control or timer mechanism advancing a predetermined appliance operational cycle so as to prevent opening of the lid 14 at various stages of the cycle. Movement of the lid 14 closed automatically closes switch 42 satisfying an important requirement that the lid be closed before the cycle can be initiated. Closure of the switch 42 allows the interlocking mechanism to be placed under the single influence of a cycle timer or control device so that the lid can be locked during the complete operating cycle or any portion thereof. The structural combination of this arrangement provides for positive and automatic interlocking of an appliance lid through use of a minimum of components, it being particularly significant that manual operation of a latch or switch is not required.

A preferred embodiment has been described for purposes of illustration only, the scope of this invention not being intended to be limited thereby except as required by the appended claims.

I claim:

1. In an appliance having a cabinet and a pivotally mounted door closing the cabinet, an electrically operated latch combination, comprising: a keeper secured to the door, said keeper moving through an arcuate path during opening and closing movements of the door, electrical control circuitry including a timer mechanism advancing the appliance through a predetermined operational cycle, an electric switch assembly secured to the cabinet and connected in said electrical circuitry, a switch-actuating arm secured to said switch assembly and extending into the arcuate path of movement of said keeper for engagement therewith, an electrically actuated solenoid assembly secured to the cabinet and including a plunger-type armature, and a latch member secured to said armature for movement therewith into engagement with said keeper and out of engagement with said keeper when said keeper engages said arm closing said switch assembly while said appliance is progressing through its operational cycle.

2. In a clothes-washing machine having a cabinet and a pivotally mounted door closing the cabinet, a latch combination, comprising: a keeper secured to the door, said keeper moving through an arcuate path during opening and closing of the door, an electric switch assembly secured to the cabinet, a switch-actuating arm secured to said switch assembly and extending into the arcuate path of movement of said keeper for engagement therewith, an electrically actuated solenoid assembly secured to the cabinet, and a plunger-type armature actuated by electrical energization and deenergization of said solenoid assembly, latching means connected to said armature for engaging said keeper and latching the door closed when said solenoid assembly is energized and disengaging said keeper and unlatching said door when said solenoid assembly is deenergized, said solenoid assembly and said switch assembly being in electrical circuitry with a washing machine timer whereby said latching means latches the door closed while said washing machine is in operation.

3. In a clothes-washing machine of the type including a cabinet having an opening closed by a pivotally mounted door and having electrical control circuitry under the influence of a timer mechanism, a latch means, comprising: a keeper secured to the door, said keeper moving through an arcuate path during opening and closing movements of the door, a supporting plate member secured to the cabinet adjacent the opening closed by said door, said plate member containing an aperture receiving said keeper when said door is closed, a solenoid assembly mounted on said supporting plate and including a plunger-type armature, a latch member secured to the armature of said solenoid assembly for reciprocal movement therewith, said latch member being aligned to engage said keeper when said door is closed, a switch assembly secured to said supporting plate member, a switch-actuating arm secured to said switch assembly and extending into the path of movement of said keeper whereby said keeper engages said switch arm and closes said switch assembly to energize said solenoid assembly and move said latch member into engagement with said keeper thereby preventing opening of the door while said washing machine is progressing through a washing cycle.

4. In a clothes-washing machine having a cabinet with an opening and a pivotally mounted door closing the cabinet opening; said washing machine being under the operational influence of an electrically actuated timer mechanism connected in control circuitry; the combination, comprising: a supporting plate secured to said cabinet adjacent the opening closed by said door, a closed loop keeper attached to said door for movement through an arcuate path during opening and closing of the door, said cabinet and said supporting plate containing aligned apertures to receive said keeper when said door is closed, a solenoid assembly secured to said supporting plate and including a coil, a plunger-type armature reciprocally actuated by the energization and deenergization of said coil, a J-shaped latch member secured to said armature for movement therewith, the short leg of the J engaging said keeper and latching said door closed while said washing machine is progressing through an operational cycle, a switch assembly secured to said supporting plate, and a switch-actuating arm secured to said switch assembly and extending into the path of said keeper whereby said switch assembly is closed when said keeper is moved to a door-closed position, said switch assembly closing said circuitry to said solenoid assembly energizing the same and retracting said J-shaped latch member into engagement with said keeper preventing opening of the door while said washing machine is proceeding through its washing cycle.

* * * * *